United States Patent
Sundareson et al.

(10) Patent No.: US 6,862,658 B2
(45) Date of Patent: Mar. 1, 2005

(54) RETRIEVING STREAMS OF DATA FROM ROTATING STORAGE MEDIUM WHILE BALANCING VARIOUS REQUIREMENTS

(75) Inventors: Prabindh Sundareson, Madurai (IN); Krishnakumar Gopalakrishnan, Trivandrum (IN)

(73) Assignee: Texas Instruments Incorporated, Dallas, TX (US)

( * ) Notice: Subject to any disclaimer, the term of this patent is extended or adjusted under 35 U.S.C. 154(b) by 304 days.

(21) Appl. No.: 10/295,993

(22) Filed: Nov. 18, 2002

(65) Prior Publication Data

US 2004/0098536 A1 May 20, 2004

(51) Int. Cl.$^7$ .............................................. G06F 12/00
(52) U.S. Cl. ..................... 711/112; 711/111; 711/154; 711/158; 713/320; 713/340; 369/29.02; 369/47.29; 369/47.3; 369/53.44
(58) Field of Search ..................... 711/112, 111, 154, 711/158; 713/320, 340; 369/29.02, 47.29, 47.3, 53.44

(56) References Cited

U.S. PATENT DOCUMENTS

| | | | |
|---|---|---|---|
| 4,611,289 A | * | 9/1986 | Coppola .................. 713/300 |
| 5,623,432 A | * | 4/1997 | Degrauwe .................. 713/321 |
| 5,703,850 A | * | 12/1997 | Wada ..................... 369/47.21 |
| 5,758,076 A | * | 5/1998 | Wu et al. ................... 709/231 |
| 5,918,073 A | * | 6/1999 | Hewitt ........................ 710/52 |
| 5,926,649 A | * | 7/1999 | Ma et al. ...................... 710/6 |
| 6,112,309 A | * | 8/2000 | Inoue et al. ................ 713/501 |
| 6,230,276 B1 | * | 5/2001 | Hayden ..................... 713/320 |
| 6,609,208 B1 | * | 8/2003 | Farkas et al. ............... 713/320 |
| 6,647,458 B1 | * | 11/2003 | Glynn ....................... 711/112 |
| 2003/0056131 A1 | * | 3/2003 | Eberhard et al. .......... 713/320 |

* cited by examiner

*Primary Examiner*—Stephen Elmore
(74) *Attorney, Agent, or Firm*—Robert D. Marshall, Jr.; W. James Brady, III; Frederick J. Telecky, Jr.

(57) ABSTRACT

Parameters characterizing physical operation of a rotating structure (disk drive) are determined by sending appropriate commands and examining the response. The measured parameters are then used to balance various requirements. For example, when starting retrieval of a data stream, a speed which leads to highest effective retrieval rate may be used such that the data elements are available quickly for use. On the other hand, in a playback mode (or a shock mode), a speed which consumes the lowest amount of electrical energy can be used.

26 Claims, 2 Drawing Sheets

RETRIEVING STREAMS OF DATA FROM ROTATING STORAGE MEDIUM WHILE BALANCING VARIOUS REQUIREMENTS

BACKGROUND OF THE INVENTION

1. Field of the Invention

The present invention relates to storage devices in portable systems using rotating storage medium, and more specifically to a method and apparatus for retrieving streams of data from rotating storage mediums while balancing various requirements (e.g., energy consumption, data throughput performance).

2. Related Art

Streams of data ("data streams") are often stored on rotating storage mediums. For example, a laser compact disc (CD) may store a sequence of digital data elements representing a song. A portable system such as a MP3 player may retrieve the data from a CD, and generate audible signals representing the corresponding song. In general, the medium in such drives rotates while data is retrieved.

Retrieval operations may need to be implemented taking into consideration several requirements. For example, in portable systems, it is usually desirable that the energy consumption be reduced (for retrieval of a data stream) such that a power source (e.g., battery) can be useful for a longer time duration.

One component which consumes substantial energy (watt-hours) while retrieving a data stream, is a rotating structure (in a storage drive). The rotating structure rotates the rotating medium while data is being retrieved. Rotating structures often consume substantial amount of electrical power (watts) as rotation generally involves mechanical tasks requiring use of force. Accordingly, it is generally desirable to minimize energy consumption while retrieving data streams.

In addition, it is often desirable that storage drives support a desired level of data throughput performance (i.e., amount of data retrieved in a unit time, hereafter "performance level") such that the data is readily available for further use (e.g., to generate audible signals in the case of MP3 system) when needed. A storage drive may support different speeds which can lead to different performance levels with associated different levels of energy consumption.

Thus, using some speeds may lead to consumption of more energy than with using other speeds. However, using some of the speeds may lead to a situation in which sufficient data is not immediately available for use when needed due to, for example, low performance level. Thus performance level and energy consumption requirements may need to be balanced while retrieving data streams from rotating mediums.

While the above scenario is described with respect to a few requirements, there may be several other requirements which need to be balanced while retrieving data. Accordingly, what is needed is a method and apparatus to retrieve data from rotating storage medium while balancing various requirements.

SUMMARY OF THE INVENTION

An aspect of the present invention enables the requirements of various modes of operation to be optimally met while retrieving data streams from a rotating medium. In an embodiment, a processing unit sends commands to a drive controller to affect the rotation of the rotating medium by controlling a rotating structure. The processing unit examines the responses from the drive controller to determine parameters characterizing a physical operation of the rotating structure. The determined parameters are then used to select one of several speeds supported by the rotating structure.

In one implementation, the effective rate ("fetch rate") of fetching data for each speed is measured, and the aggregate energy consumption (e.g., measured in watt-hours) for each speed is determined (based on the fetching rate and the power consumption (e.g., measured in Watts) at the specific speeds). When energy consumption is to be minimized (e.g, in a play-back mode of an MP3 player), the speed which would consume least energy is used.

Another aspect of the present invention minimizes the number of times a rotation operation is started when retrieving a data stream when using a reserve buffer for buffering the retrieved data prior to actual use. As the data is consumed (retrieved from the reserve buffer), the specific time point to start retrieval of the next portion of the data stream is determined according to the equation:

$$T\text{remaining} < T\text{change}[0 \text{ to DeterminedSpeed}] + T\text{low} \quad \text{Equation (1)}$$

wherein Tremaining represents a time duration in which the presently available data in the reserve buffer would be consumed at a present rate of consumption, Tchange is the time duration required to speed up rotating medium to a desired speed, and Tlow represents a time duration in which a minimum amount of data (desired to be maintained in reserve buffer) would be consumed at a present rate of decoding (i.e., the rate at which data is being consumed/retrieved from reserve buffer 170).

By minimizing the number of times the rotation operation is started, energy consumption may be reduced further.

Other considerations may be given higher priority in other modes. For example, in a startup mode (in which the retrieval of the data stream is started), the speed with the highest fetch rate may be used such that data is quickly available for use.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

According to an aspect of the present invention, commands are sent to a disk drive to ascertain the parameters characterizing the operation of the disk drive. The ascertained parameters are then used in determining the manner in which data is to be retrieved. In an embodiment in which several speeds of rotation (of the rotating medium) are supported, the effective rate of data retrieval in each speed, the amount of time required to reach a desired speed from a present speed and the total energy required to fill an intermediate buffer are ascertained, and the ascertained parameters are used to determine the specific times at which to start retrieving data and the specific speed to use, etc.

By using such parameters, various requirements (minimization of energy consumption, performance level) can be balanced.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Device

Figure 1:
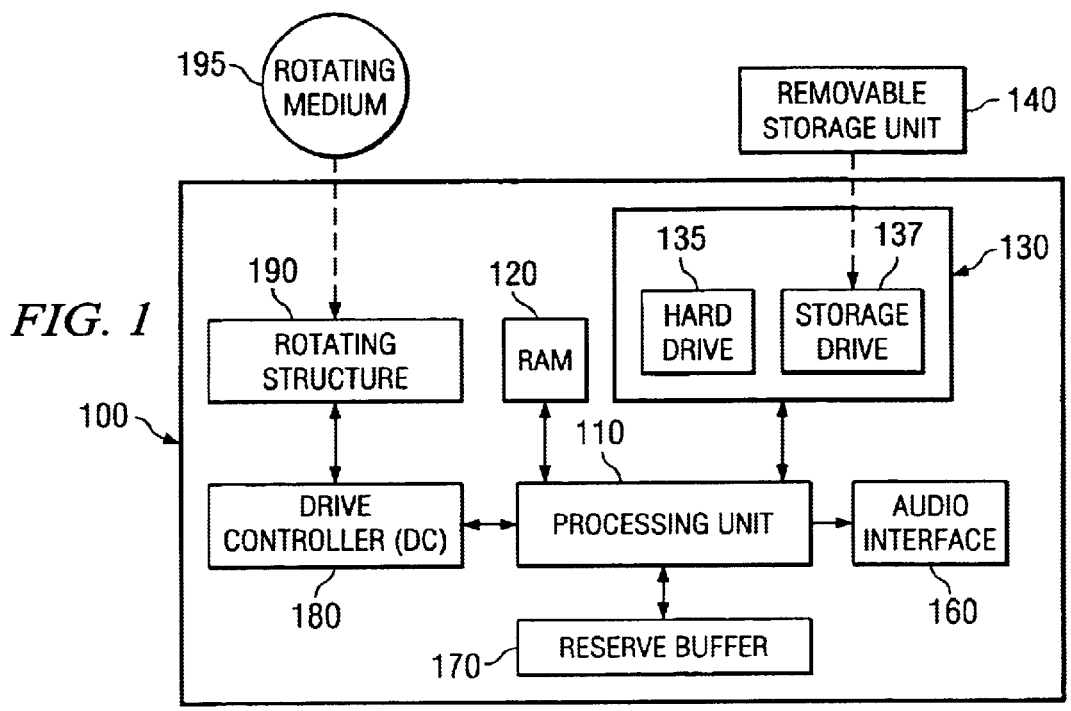
FIG. 1 is a block diagram illustrating the details of an example device in which the present invention can be implemented.

FIG. 1 is a block diagram illustrating an example device 100 in which the present invention can be implemented. Device 100 may represent an MP3-player which plays a song represented by digital data stored on rotating medium 195. Device 100 is shown containing processing unit 110, random access memory (RAM) 120, secondary memory 130, audio interface 160, reserve buffer 170, drive controller 180, and rotating structure 190. The components of FIG. 1 are described below in further detail.

Audio interface 160 generate audible signals using digital data elements received from reserve buffer 170. The audible signals may represent a song in case device 100 corresponds to an MP3 player and rotating medium 195 corresponds to a compact disk storing digital data representing the song.

Reserve buffer 170 enables processing unit 110 to read digital data elements ahead of a time when required by audio interface 160. Such a read-ahead may enable audible signals (e.g., song) to be generated continuously even though a latency is generally present in receiving digital data elements from drive controller 180 after sending corresponding retrieve command(s). In addition, rotating structure 190 can be stopped when there is sufficient data in reserve buffer 170.

Drive controller 180 receives commands to retrieve data, and interfaces with rotating structure 190 to retrieve the requested data. The commands may specify various parameters such as a start address, number of bytes to be retrieved, and a speed of rotating structure 190 to be used in retrieving the data. The retrieved data is provided to processing unit 110.

Rotating structure 190 operates under the control of drive controller 180 to rotate the rotating medium 195 while retrieving digital data elements. Rotating structure 190 generally consumes a substantial portion of electrical energy consumed by device 100, and accordingly it may be desirable to minimize the energy consumption.

In general, drive controller 180 and rotating structure 190 need to be implemented consistently, and form part of a storage drive. Only the details of storage drive as necessary for an understanding of the present invention are described in the subject application, in the interest of conciseness. In an embodiment, drive controller 180 is implemented using TDA7522 integrated circuit available from ST Micro electronics, 1060 E. Brokaw Road, San Jose, Calif. 95131 (www.st.com).

Processing unit 110 may execute instructions stored in RAM 120 to provide several features of the present invention. Processing unit 110 may contain multiple units, with each unit potentially being designed for a specific task. Alternatively, processing unit 110 may contain only a single unit. RAM 120 may receive instructions from secondary memory 130 via processing unit 10. In an embodiment, RAM 120 is integrated internal to processing unit 10. In addition, processing unit 110 and drive controller 180 may be integrated as one unit.

With reference to retrieval of data, processing unit 110 sends commands to drive controller 180, and receives data in response. Processing unit 110 may determine various parameters characterizing the mechanical operation of the disk drive, and use the determined parameters to balance different requirements according to various aspects of the present invention as described in sections below.

Secondary memory 130 generally provides non-volatile data storage storing various software instructions and data, which enable device 100 to provide several features in accordance with the present invention. The instructions may be provided using ROM, Flash memory, etc. In the embodiment of FIG. 1, secondary memory 130 is shown containing hard drive 135 and flash drive 137 (for receiving flash memory 140 on which software instructions are provided). However, secondary memory may be implemented using various other mediums such as Floppy drive, magnetic tape drive, CD-ROM drive, DVD Drive, removable memory chip (PCMCIA Card, EPROM).

Removable storage unit 140 may be implemented using medium and storage format compatible with removable storage drive 137 such that removable storage drive 137 can read the data and instructions. Thus, removable storage unit 140 includes a computer usable storage medium having stored therein computer software and/or data. An embodiment of the present invention is implemented using software running (that is, executing) in device 100.

In this document, the term "computer program product" is used to generally refer to removable storage unit 140 or any non-volatile memory providing software instructions to device 100. These computer program products are means for providing software to device 100. As noted above, processing unit 110 may retrieve the software instructions from such computer readable mediums, and execute the instructions to provide various features of the present invention. The features of the present invention are described below in further detail.

3. Method

Figure 2:
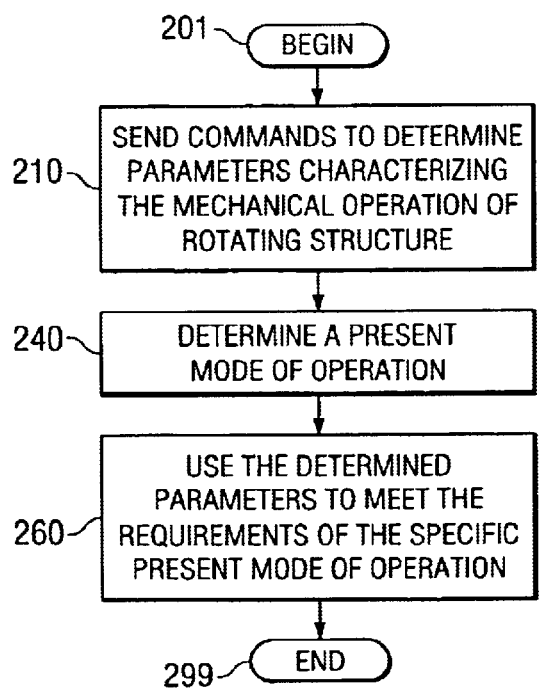
FIG. 2 is a flow-chart illustrating the details of a method in accordance with an aspect of the present invention.

FIG. 2 is a flowchart illustrating a method using which data streams are retrieved in an embodiment of the present invention. The method is described with reference to components of FIG. 1 for illustration. However, the method can be implemented in other embodiments as well. The method begins in step 201, in which control immediately passes to step 210.

In step 210, processing unit 110 sends commands to drive controller 180 to determine parameters characterizing the mechanical operation of rotating structure. In an embodiment described below, the parameters include an amount of time required to fill reserve buffer 170, an amount of time required to change from one speed to another, etc. However, other parameters can be measured as well depending on the manner which various requirements are sought to be balanced.

In step 240, a present mode of operation for device 100 is determined. In step 260, processing unit 110 uses the determined parameters to meet the requirements of the specific present mode of operation. Examples of various modes and the manner in which various requirements can be balanced are described in sections below in further detail. The method then ends in step 299.

The description is continued with reference to some example parameters and the manner in which the example parameters can be measured.

4. Time Required to Fill Reserve Buffer

In an embodiment of the present invention, the effective time (Tfetch[i], i being an integer index representing various speeds) required to fill reserve buffer 170 is measured for each speed supported by rotating structure 190. It is helpful to appreciate that the time required to fill reserve buffer 170 (or effective data rate) may not be strictly inversely proportionate to the speed since errors may be encountered during data retrieval, particularly at high speeds of rotation.

Thus, in an embodiment, to measure Tfetch for a particular speed, processing unit 110 sends a command to drive controller 180 requesting that rotating medium 195 be operated to rotate with the speed. Drive controller 180 may control rotating structure 190 to cause such a speed to be set up. In one implementation, assuming that the desired speed can be attained in less than a second, processing unit 110 waits for a few seconds (e.g., 5–10 seconds) to ensure that such a speed is attained.

Once the desired speed is attained, processing unit 110 notes (i.e., stores data representing) the start time for filling reserve buffer 170, and issues commands to drive controller 180 to retrieve data from rotating medium 195. In an embodiment, each command specifies a starting address on rotating medium 195, and the amount of data to be retrieved from that address. The data retrieved corresponding to the commands is stored in reserve buffer 170, and Tfetch for the corresponding speed is computed as the difference between the start time and the end time.

Several tasks may need to be performed while receiving data after issuing commands. For example, data integrity check may be performed on the received data, for example, using Reed-Solomon code type well known error correction techniques. After the data integrity is confirmed, data headers in the received data may be examined to confirm whether the received data is retrieved from an expected location (based on the start address sent in the command). The data is stored in reserve buffer 170 only if the data is determined to be retrieved from the correct address and if the data had passed the integrity check. The value of Tfetch increases as the number of errors encountered increases.

In addition, even if the data is retrieved accurately (passing integrity and address checks), it may sometimes be necessary to re-fetch data. For example, processing unit 110 may need to store the received data in compressed format, and the necessary processing delays may cause processing unit 110 missing the next received data elements. Accordingly, the number of re-fetches (Nrefetch) required in such situation may also be kept track for each speed.

Thus, using the approach described above, Tfetch (amount of time required to fill reserve buffer 170) and number of re-fetches (Nrefetch) may be computed for each of the possible speeds supported by rotating structure 190.

5. Time Required to Change Speed

Another parameter, which may be computed according to an aspect of the present invention is the time required (Tchange) to change rotating medium 195 from one speed to another. In an embodiment, processing unit 110 first ensures that rotating medium 195 is rotating at a first desired speed. Then a command is issued requesting rotating structure 190 to change the speed of rotation to a second desired speed. The data received is continuously monitored for the rate of errors (number of errors per the examined number of bits), and when the rate of errors is determined to be less than a pre-specified threshold, the second desired speed is deemed to be reached.

The time Tchange (from the first desired speed to the second desired speed) is set equal to the duration from issuing of the command (to change the speed of rotation) to the time the second desired speed is deemed to have been reached. Thus, the value Tchange may be computed from each possible speed to the remaining possible speed. For example, if rotating structure 190 supports K speed, $(K^2-K)$ values may be computed, as noted above.

Using the parameters thus computed various requirements may be balanced depending on the specific mode of operation as described below in further detail.

6. Startup Mode

Startup mode refers to a mode in which rotating medium 195 is still (i.e., not rotating) and needs to be rotated to start retrieving a data stream. In an embodiment, the speed with minimal Tfetch (among the values for all the speed) is used to fill reserve buffer 170 such that the buffer can be filled quickly and a song corresponding to the retrieved data can be played quickly. By using the speed with the highest effective retrieval rate, more energy may be consumed but the data is available quickly for usage. However, if quick availability of data is less important than energy consumption, the same approach as in playback mode below may be used.

7. Playback Mode

Playback mode refers to a mode in which a data stream is being retrieved into reserve buffer 170 and being used (for example to play a portion of a song). Retrieval generally entails causing rotating structure 190 to be activated (to rotate rotating medium 195). It is generally desirable to minimize the number of times rotating medium 195 is activated for retrieval of data, at least to minimize energy consumption. However, reserve buffer 170 needs to be replenished with data well before being emptied due to usage of the data. Based on such requirements, the following approach is used in starting rotating structure 190 in an embodiment of the present invention.

Figure 3:
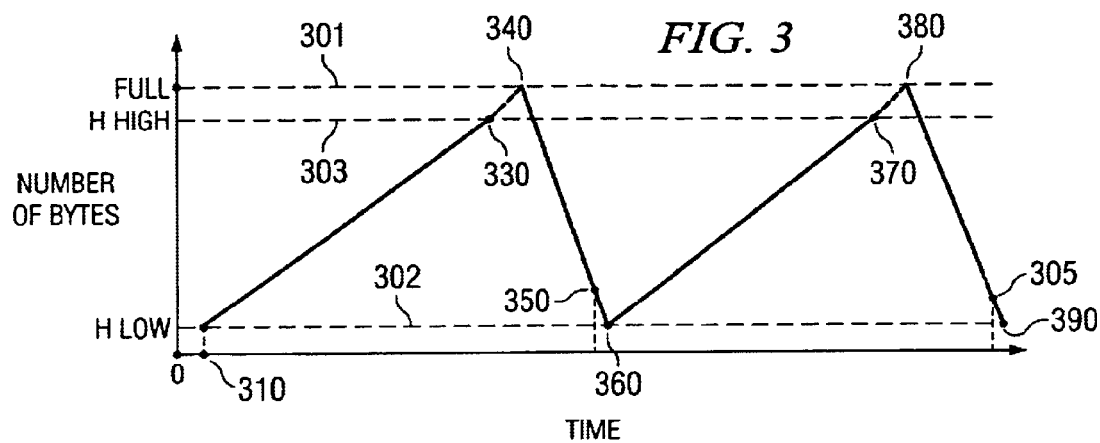
FIG. 3 is a graph illustrating the manner in which the rotation of rotating medium can be stopped and started according to an aspect of the present invention.

FIG. 3 is a graph illustrating the specific time points at which rotating structure 190 may start and stop rotating the rotating medium 195. With respect to stopping, it may be appreciated that the rotation of the medium continues even after rotating structure 190 stops the rotation effort. On the other hand, effective retrieval of data lags the issuing of the corresponding command due to the lag time encountered with rotating medium 195 reaching the desired rotation speed (after issuance of the corresponding command).

The X-axis and Y-axis respectively represent time and the number of bytes remaining in reserve buffer 170 in the playback mode. Point 301 on Y-axis represents a number of bytes corresponding to a situation when reserve buffer 170 is full. Point 302 represents the minimum amount of data (Hlow) desirable to be maintained in reserve buffer 170 to ensure continuity of availability of data for use by processing unit 110. Data is shown being retrieved and consumed (used) in time durations 310–340, and 360–380, whereas data is merely being consumed in time durations 340–360 and 380–390.

As the effective start of retrieval of data lags the issuance of the retrieval commands, it is desirable to issue the retrieval commands before the number of bytes in reserve buffer 170 reaches lower threshold 302. Thus, for example, with reference to time point 360 (at which data in reserve buffer 170 would reach Hlow 302), it would be desirable to start retrieval tasks at time point 350 (which is slightly ahead of time point 360). The manner in which time point 350 can be determined is described below with reference to FIG. 4.

Figure 4:
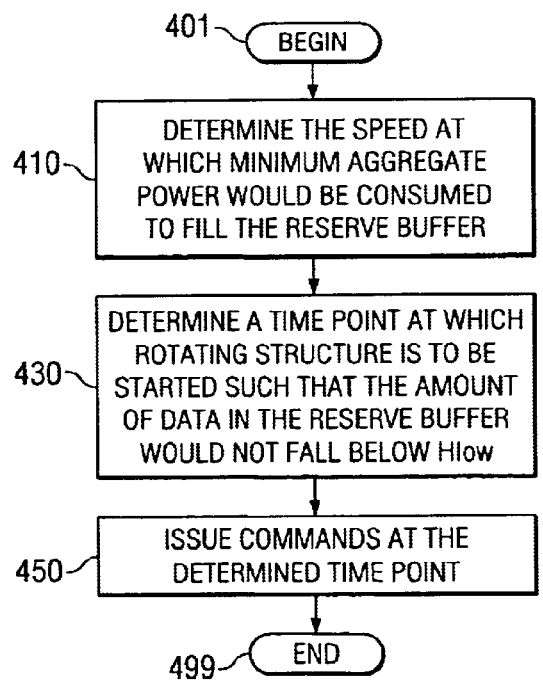
FIG. 4 is a flow-chart illustrating the details of a method using which data can be retrieved into a reserve buffer according to an aspect of the present invention.

FIG. 4 is a flow chart illustrating the manner in which data retrieval tasks can be started in an embodiment of the present invention. The method is described with reference to FIGS. 1 and 3 for illustrations The method starts in step 401, in which control passes to step 410. In step 410, processing unit 110 determines the speed at which minimum aggregate energy would be consumed to fill the reserve buffer. The aggregate energy requirement may be determined in various ways, and an example approach is described below.

In an embodiment, the rate of energy consumption for each speed is determined based on data sheets provided by a manufacturer of rotating structure 190. The rate of energy consumption is multiplied by an amount of time that would be required to fill reserve buffer 170 at the corresponding speed, to determine the aggregate energy requirement at that speed. The amount of time in turn is computed by dividing the number of bytes between Hlow 302 and full 301 by effective rate (Reffectivefill) at which reserve buffer 170 would be filled in view of both filling due to retrieval and the consumption of the data in the buffer.

Reffectivefill may be computed based on the corresponding Tfetch value computed above (which takes into account any errors that may be expected to be encountered at a given speed). Reffectivefill would be inversely proportional to the corresponding Tfetch value. Thus, the aggregate energy consumption at each speed may be determined.

The above approach of determining aggregate energy consumption assumes that rotating medium 195 is not rotating to start with, and also that the energy consumed to speed up rotating medium 195 is small/negligible compared to the energy consumption during rotation. More complex approaches may be employed to accurately compute the energy consumption depending on an understanding of the specific technology/components used to implement the disk drives. Such approaches will be apparent to one skilled in the relevant arts by reading the disclosure provided herein, and the approaches are contemplated to be within the scope and spirit of the present invention.

Continuing with reference to FIG. 4, in step 430, processing unit 110 determines a time point at which the rotation of rotating medium 195 is to be started such that the amount of data in the reserve buffer would not fall below Hlow. In an embodiment, the time point is deemed to be reached when the following equation becomes true:

$$T\text{remaining} < T\text{change}[0 \text{ to DeterminedSpeed}] + T\text{low} \quad \text{Equation (1)}$$

wherein Tremaining represents a time duration in which the presently available data in reserve buffer 170 would be consumed at a present rate of consumption, Tchange is the time duration required to speed up rotating medium 195 to the speed determined in step 410, '<' represents a less than logical operation, '+' represents addition operation, and Tlow represents a time duration in which Hlow 302 amount of data would be consumed at a present rate of decoding. Hlow can be different for different speeds. The computation of Tremaining and Tlow will be apparent to one skilled in the relevant arts.

In step 450, processing unit 110 issues rotate commands to drive controller 180 at the time point determined in step 430. The rotate commands cause rotating structure 190 to rotate rotating medium 195 and the retrieve commands may be issued after a time duration of Tchange elapses. The data starts filling reserve buffer 170 as represented by lines in time durations 310 through 340 and 380 through 390.

By using approaches according to FIG. 4, the consumption of aggregate electrical energy may be reduced. Additional reductions may be attained by issuing stop commands to drive controller 180 at time points 330 and 370, that is, before reserve buffer 170 is completely full. Even after rotating structure 190 stops the rotation task, rotating medium 195 continues rotation until friction type factors bring it to a stop status. Data may be retrieved during such rotation as well, and accordingly energy consumption may be reduced by not trying to continue to rotate rotating medium 195 after time points 330 and 370. The approach of FIG. 4 is used again to resume rotation of rotating medium 195.

8. Shock Mode

Shock mode refers to a situation in which device 100 is encountering physical shocks (for example, as a person carrying device 100 is moving), and data cannot be retrieved reliably when a shock occurs. In general, several devices generate a shock indicator, which indicates whether a shock has presently occurred. The shock indicators can be generated in a known way.

At least during shock modes, it may be desirable to store data in reserve buffer 170 in compressed format. When storing in compressed format Equation (1) may be modified as follows to determine the time point at which to issue rotate commands.

$$T\text{remaining} < T\text{change [0 to DeterminedSpeed]} + T\text{low}*C \quad \text{Equation (2)}$$

wherein '*' represents a multiplication operation, C represents a compression ratio (greater than or equal to 1). The remaining symbols are described above with respect to Equation (1). Due to the compression, the rotation commands are issued late compared to time points of Equation (1).

In addition, when a shock is determined to have occurred (as indicated by a shock indicator), the data received from drive controller 180 may be invalid (erroneous). Accordingly, during the shock mode, the retrieved data is discarded. Also, rotating medium 195 may be continuing to rotate at a speed (X) when the shock condition disappears (stops). In such a situation, the speed at which to resume operation may be determined by evaluating Equation (3) for each of the speeds ("SpeedUnderConsideration"), and choosing the speed which evaluates to the least value:

$$T\text{change}[X \text{ to SpeedUnderConsideration}] + T\text{low}*C \quad \text{Equation (3)}$$

wherein X is the present speed as noted above.

Thus, Equation (3) takes advantage of the present speed such that the data retrieval can start quickly. In addition, some consideration is given to the effective speed of retrieval by using the second factor (Tlow*C), in that a low corresponding value (for that speed) makes the speed more likely to be chosen.

Thus, by measuring parameters characterizing the physical operation of a disk drive, streams of data can be retrieved while balancing various requirements.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of retrieving a data stream from a rotating medium, wherein said rotating medium is controlled by a rotating structure which can rotate said rotating medium at a plurality of speeds, said method being performed in a device including said rotating medium and said rotating structure, said method comprising:

sending a first plurality of commands to determine a plurality of fetch rates, wherein each of said plurality of fetch rates corresponds to an effective rate of retrieval of data from said rotating medium at a corresponding one of a plurality of speeds;

determining an amount of electrical energy that would be consumed in each of said plurality of speeds according to said plurality of fetch rates and corresponding rates of energy consumption at corresponding speeds; and using a first speed which would consume a minimum amount of electrical energy, wherein said first speed is comprised in said plurality of speeds.

2. The method of claim 1, further comprising storing a portion of said data stream in a reserve buffer.

3. The method of claim 2, further comprising:

retrieving said portion of said data stream from said reserve buffer; and generating audible sounds from said portion of said data stream after said retrieving.

4. The method of claim 2, wherein each of said plurality of fetch rates is computed based on an amount of time required to fill said reserve buffer.

5. The method of claim 2, further comprising sending a second plurality of commands to determine a plurality of change times, wherein each of said plurality of change times represents a time duration required to change rotating of said rotating medium from a corresponding start speed to a corresponding end speed.

6. The method of claim 5, wherein said first speed is used when said device is in a playback mode in which a sequence of data elements in said data stream are used in successive intervals, said method further comprising:

issuing a rotate command at a time point when a first condition is evaluated to true, wherein said rotate command causes said rotating structure to rotate said rotating medium at said first speed, wherein said first condition equals $$\{Tremaining < Tchange[0 \text{ to } DeterminedSpeed] + Tlow\},$$

wherein Tremaining represents a time duration in which a presently available data in said reserve buffer would be consumed at a present rate of consumption, Tchange is a time duration required to speed up said rotating medium to said first speed, '<' represents a less than logical operation, '+' represents addition operation, and Tlow represents a time duration in which a threshold amount of data would be consumed at a present rate of decoding.

7. The method of claim 6, wherein said first condition is used if said portion is stored in an uncompressed format in said reserve buffer, wherein a second condition is used to determine said time point if said portion is stored in a compressed format, wherein said second condition equals $$\{Tremaining < Tchange[X \text{ to } DeterminedSpeed] + Tlow*C\}$$

wherein '*' represents a multiplication operation and C represents a compression ratio used to store said portion in said reserve buffer, wherein X represents a start speed of said rotating medium, and wherein said DeterminedSpeed represents a desired speed which is to be used for retrieving data into said reserve buffer.

8. The method of claim 7, wherein said device operates in a shock mode in which physical shocks are encountered, said portion being stored in said compression mode in said shock mode.

9. The method of claim 8, wherein said DeterminedSpeed is determined by evaluating a second equation for each of said plurality of speeds and determining a second speed as said DeterminedSpeed, wherein said second equation evaluates to a minimal value of all of said plurality of speeds, wherein said second equation comprises:

$$Tchange[PresentSpeed \text{ to } SpeedUnderConsideration] + Tlow*C,$$

wherein PresentSpeed represents a present speed at which said rotating medium is presently rotating and SpeedUnderConsideration represents a speed for which said second equation is being evaluated.

10. The method of claim 5, wherein said first speed is used when said device is in a playback mode in which a sequence of data elements in said data stream are used in successive intervals, said method further comprising:

using a second speed if said device is in a startup mode in which a beginning of said data stream is to be retrieved, said second speed being comprised in said plurality of speeds, wherein said second speed has a maximum one of said plurality of fetch rates.

11. A method of retrieving a data stream from a rotating medium, wherein said rotating medium is controlled by a rotating structure which can rotate said rotating medium at a plurality of speeds, said rotating structure being controlled by a drive controller, said method comprising:

sending a first plurality of commands to said drive controller, each of said first plurality of commands being designed to affect rotation of said rotating medium by controlling said rotating structure;

determining a plurality of parameters by examining responses from said drive controller, said plurality of parameters characterizing a physical operation of said rotating structure; and determining a first speed to use in retrieving said data stream according to said plurality of parameters, wherein said first speed is comprised in said plurality of speeds.

12. The method of claim 11, wherein said plurality of parameters comprise a time required to fetch a specified amount of data for each of said plurality of speeds and a time required to change rotation from a start speed to an end speed, wherein said start speed and said end speed are comprised in said plurality of speeds.

13. A computer readable medium carrying one or more sequences of instructions for causing retrieval of a data stream from a rotating medium, wherein said rotating medium is controlled by a rotating structure which can rotate said rotating medium at a plurality of speeds, wherein execution of said one or more sequences of instructions by one or more processors contained in a device causes said one or more processors to perform the actions of:

sending a first plurality of commands to determine a plurality of fetch rates, wherein each of said plurality of fetch rates corresponds to an effective rate of retrieval of data from said rotating medium at a corresponding one of a plurality of speeds;

determining an amount of electrical energy that would be consumed in each of said plurality of speeds according to said plurality of fetch rates and corresponding rates of energy consumption at corresponding speeds; and using a first speed which would consume a minimum amount of electrical energy, wherein said first speed is comprised in said plurality of speeds.

14. The computer readable medium of claim 13, further comprising storing a portion of said data stream in a reserve buffer.

15. The computer readable medium of claim 14, further comprising:

retrieving said portion of said data stream from said reserve buffer; and generating audible sounds from said portion of said data stream after said retrieving.

16. The computer readable medium of claim 14, wherein each of said plurality of fetch rates is computed based on an amount of time required to fill said reserve buffer.

17. The computer readable medium of claim 14, further comprising sending a second plurality of commands to determine a plurality of change times, wherein each of said plurality of change times represents a time duration required to change rotating of said rotating medium from a corresponding start speed to a corresponding end speed.

18. The computer readable medium of claim 17, wherein said first speed is used when said device is in a playback mode in which a sequence of data elements in said data stream are used in successive intervals, further comprising:

issuing a rotate command at a time point when a first condition is evaluated to true, wherein said rotate command causes said rotating structure to rotate said rotating medium at said first speed, wherein said first condition equals $$\{Tremaining < Tchange[0 \text{ to } DeterminedSpeed] + Tlow\},$$

wherein Tremaining represents a time duration in which a presently available data in said reserve buffer would be consumed at a present rate of consumption, Tchange is a time duration required to speed up said rotating medium to said first speed, '<' represents a less than logical operation, '+' represents addition operation, and Tlow represents a time duration in which a threshold amount of data would be consumed at a present rate of decoding.

19. The computer readable medium of claim 18, wherein said first condition is used if said portion is stored in an uncompressed format in said reserve buffer, wherein a second condition is used to determine said time point if said portion is stored in a compressed format, wherein said second condition equals $$\{Tremaining < Tchange[X \text{ to } DeterminedSpeed] + Tlow*C\}$$

wherein '*' represents a multiplication operation and C represents a compression ratio used to store said portion in said reserve buffer, wherein X represents a start speed of said rotating medium, and wherein said DeterminedSpeed represents a desired speed which is to be used for retrieving data into said reserve buffer.

20. The computer readable medium of claim 19, wherein said device operates in a shock mode in which physical shocks are encountered, said portion being stored in said compression mode in said shock mode.

21. The computer readable medium of claim 20, wherein said DeterminedSpeed is determined by evaluating a second equation for each of said plurality of speeds and determining a second speed as said DeterminedSpeed, wherein said second equation evaluates to a minimal value of all of said plurality of speeds, wherein said second equation comprises:

$$Tchange[PresentSpeed \text{ to } SpeedUnderConsideration] + Tlow*C,$$

wherein PresentSpeed represents a present speed at which said rotating medium is presently rotating and SpeedUnderConsideration represents a speed for which said second equation is being evaluated.

22. The computer readable medium of claim 17, wherein said first speed is used when said device is in a playback mode in which a sequence of data elements in said data stream are used in successive intervals, further comprising:

using a second speed if said device is in a startup mode in which a beginning of said data stream is to be retrieved, said second speed being comprised in said plurality of speeds, wherein said second speed has a maximum one of said plurality of fetch rates.

23. A computer readable medium carrying one or more sequences of instructions for causing retrieval of a data stream from a rotating medium, wherein said rotating medium is controlled by a rotating structure which can rotate said rotating medium at a plurality of speeds, said rotating structure being controlled by a drive controller, wherein execution of said one or more sequences of instructions by one or more processors contained in a device causes said one or more processors to perform the actions of:

sending a first plurality of commands to said drive controller, each of said first plurality of commands being designed to affect rotation of said rotating medium by controlling said rotating structure;

determining a plurality of parameters by examining responses from said drive controller, said plurality of parameters characterizing a physical operation of said rotating structure; and determining a first speed to use in retrieving said data stream according to said plurality of parameters, wherein said first speed is comprised in said plurality of speeds.

24. The computer readable medium of claim 23, wherein said plurality of parameters comprise a time required to fetch a specified amount of data for each of said plurality of speeds and a time required to change rotation from a start speed to an end speed, wherein said start speed and said end speed are comprised in said plurality of speeds.

25. An apparatus for retrieving a data stream from a rotating medium, wherein said rotating medium is controlled by a rotating structure which can rotate said rotating medium at a plurality of speeds, said apparatus being comprised in a device including said rotating medium and said rotating structure, said apparatus comprising:

means for sending a first plurality of commands to determine a plurality of fetch rates, wherein each of said plurality of fetch rates corresponds to an effective rate of retrieval of data from said rotating medium at a corresponding one of a plurality of speeds;

means for determining an amount of electrical energy that would be consumed in each of said plurality of speeds according to said plurality of fetch rates and corresponding rates of energy consumption at corresponding speeds; and means for using a first speed which would consume a minimum amount of electrical energy, wherein said first speed is comprised in said plurality of speeds.

26. An apparatus for retrieving a data stream from a rotating medium, wherein said rotating medium is controlled by a rotating structure which can rotate said rotating medium at a plurality of speeds, said rotating structure being controlled by a drive controller, said apparatus comprising:

means for sending a first plurality of commands to said drive controller, each of said first plurality of commands being designed to affect rotation of said rotating medium by controlling said rotating structure;

means for determining a plurality of parameters by examining responses from said drive controller, said plurality of parameters characterizing a physical operation of said rotating structure; and means for determining a first speed to use in retrieving said data stream according to said plurality of parameters, wherein said first speed is comprised in said plurality of speeds.

* * * * *